UNITED STATES PATENT OFFICE.

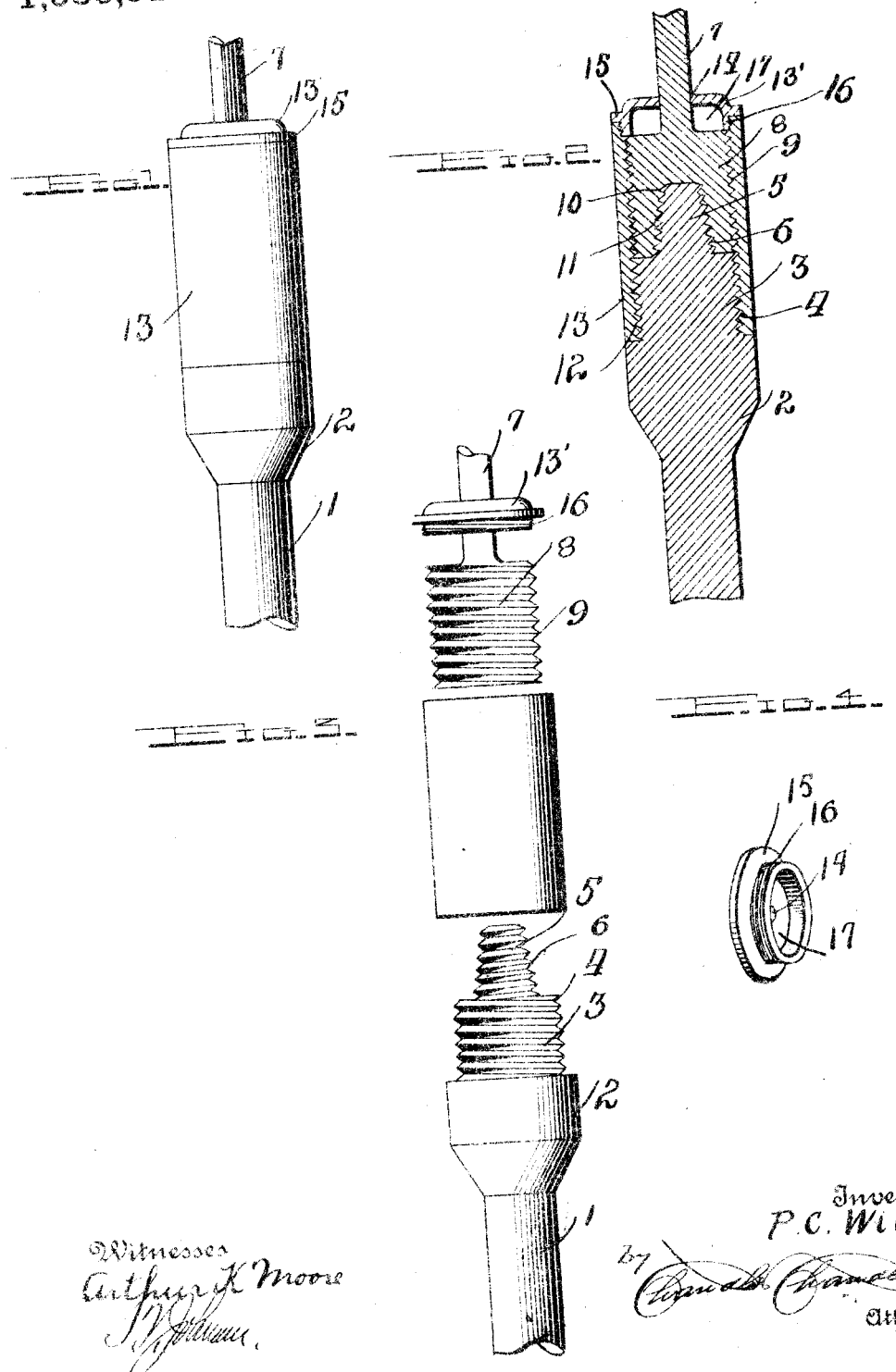

PRESLAY C. WILLS, OF MONTICELLO, UTAH, ASSIGNOR OF ONE-THIRD TO LEE W. GALLOWAY, OF MONTROSE, COLORADO.

COUPLING FOR DRILLS.

1,085,515.   Specification of Letters Patent.   Patented Jan. 27, 1914.

Application filed January 22, 1913. Serial No. 743,641.

*To all whom it may concern:*

Be it known that I, PRESLAY C. WILLS, a citizen of the United States, residing at Monticello, in the county of San Juan, State of Utah, have invented certain new and useful Improvements in Couplings for Drills; and I do hereby declare the following to be a full, clear, and exact description of the invention, such as will enable others skilled in the art to which it appertains to make and use the same.

The present invention is directed to improvements in couplings for drills, and has for its object to provide a simple and efficient device of this character whereby the drill and bit shaft may be effectually connected, and held firmly in this position.

A further object of the invention is to provide a coupler which is exceedingly simple in construction, and one which may be manufactured at a minimum cost.

With these and other objects in view, this invention resides in the novel features of construction, formation, combinations and arrangements of parts to be hereinafter more fully described, claimed and illustrated in the accompanying drawing, in which:—

Figure 1 is a side elevation of the parts showing them in their coupled positions. Fig. 2 is a longitudinal sectional view. Fig. 3 is a side elevation of the parts previous to the coupling thereof. Fig. 4 is a perspective view of the cap.

Referring to the drawing, the numeral 1 designates the bit shaft, the upper end of which is provided with an enlarged portion 2 having the reduced extension 3, the periphery of which is provided with left hand threads 4. Rising from the center of the extension 3 is a conical extension 5, the sides of which are provided with right hand threads 6. The drill shaft 7 is provided at its lower end with the circular head 8, having the left hand threads 9 formed upon its periphery. The head 8 is provided with a central conical bore 10, the walls of which are provided with right hand threads 11, so that the conical extension 5 will readily engage therewith. By providing the extension 3 upon the enlarged portion 2 an annular shoulder 12 is produced which limits the movement of the internally left hand sleeve 13, which is adapted to inclose the circular head 8 and extension 3 when the conical extension 5 is seated in the conical bore 10.

A cap 13′ is provided and is formed with a central aperture 14 for receiving the drill shaft 7, said cap having its under side provided with an annular flange 15, the same being provided with left hand threads 16 which engage the interior threads of the sleeve 13, said flange being of sufficient height to rest upon the upper surface of the circular head 8 when the parts are connected, thereby providing a space 17 to receive suitable packing to prevent moisture from entering the parts inclosed by the sleeve.

In assembling the parts in their coupled condition it is only necessary to connect the extension 3 and head 8 through the medium of the conical extension 5 and bore 10, whereupon the sleeve 13 is threaded upon the parts and the cap 13′ manipulated until the flange thereof rests upon the upper surface of the head 8, thereby firmly connecting the parts together.

From the foregoing description taken in connection with the accompanying drawing, the operation and advantages of the device will be apparent to those skilled in the art.

What is claimed is:—

In a coupling of the class described, the combination with a drill shaft, of a bit shaft having an enlarged portion, an extension formed upon said portion, an annular shoulder formed adjacent the extension, a conical extension formed upon the upper end of the said extension, a circular head formed upon the lower end of the drill shaft and having a conical bore formed therein, said conical extension being provided with right hand threads for engaging the similar threads formed interiorly of the bore, an interiorly threaded sleeve adapted to inclose the circular head and extension, and engaging the threads carried thereby, said sleeve having its lower end adapted to engage said annular shoulder to limit the movement thereof, and a cap having a central aperture adapted to receive the drill shaft, said cap having an annular exteriorly threaded flange formed upon its under surface and adapted to engage with the thread of the sleeve, said flange being adapted to bear against the upper surface of the circular head, said cap having a space formed therein and located above the upper surface of said head, as and for the purpose set forth.

In testimony whereof, I affix my signature, in presence of two witnesses.

PRESLAY C. WILLS.

Witnesses:
 N. C. CHRISTENSEN,
 HEBER. CHRISTENSEN.